United States Patent
Cheng et al.

(10) Patent No.: US 7,944,688 B2
(45) Date of Patent: May 17, 2011

(54) HEAT DISSIPATING STRUCTURE INCLUDING A POSITION-ADJUSTING UNIT

(75) Inventors: Hsueh-Lung Cheng, Taipei (TW); Ming-Feng Tsai, Taipei (TW)

(73) Assignee: Ama Precision Inc., Taipei (TW)

( * ) Notice: Subject to any disclaimer, the term of this patent is extended or adjusted under 35 U.S.C. 154(b) by 225 days.

(21) Appl. No.: 12/332,032

(22) Filed: Dec. 10, 2008

(65) Prior Publication Data
US 2009/0161313 A1 Jun. 25, 2009

(30) Foreign Application Priority Data

Dec. 21, 2007 (TW) .............................. 96149424 A

(51) Int. Cl.
 *H05K 7/20* (2006.01)
 *F28F 7/00* (2006.01)
 *H01L 23/34* (2006.01)
(52) U.S. Cl. .............. 361/679.47; 361/679.52; 361/700; 165/80.4; 165/80.5; 165/104.33; 257/714; 257/715; 257/E23.088; 174/15.2
(58) Field of Classification Search ............. 361/679.47, 361/679.52, 700; 165/80.4–80.5, 104.33, 165/185; 257/714–718, E23.088; 174/15.2
See application file for complete search history.

(56) References Cited

U.S. PATENT DOCUMENTS

| 5,808,869 | A | * | 9/1998 | Donahoe et al. ............... 361/704 |
| 6,307,747 | B1 | | 10/2001 | Farnsworth et al. |
| 7,321,491 | B2 | * | 1/2008 | Long et al. ............... 361/679.48 |
| 7,755,900 | B2 | * | 7/2010 | Cheng ............................ 361/710 |
| 2007/0058347 | A1 | * | 3/2007 | Tsai et al. ...................... 361/703 |
| 2008/0035311 | A1 | * | 2/2008 | Hsu ............................. 165/104.21 |
| 2008/0192427 | A1 | * | 8/2008 | Wu et al. ........................ 361/687 |

FOREIGN PATENT DOCUMENTS

| CN | 2798519 | 7/2006 |
| CN | 1874670 | 12/2006 |

\* cited by examiner

*Primary Examiner* — Zachary M Pape
(74) *Attorney, Agent, or Firm* — Muncy, Geissler, Olds & Lowe, PLLC

(57) ABSTRACT

A heat dissipating structure for a heat source includes a position-adjusting unit, a first heat dissipating element, a second heat dissipating element and a first heat conducting element. The position-adjusting unit has an elastic element. The first heat dissipating element is connected with the position-adjusting unit. The second heat dissipating element contacts with the heat source. One end of the first heat conducting element contacts with the first heat dissipating element, and the other end of the first heat conducting element contacts with the second heat dissipating element. The position-adjusting unit adjusts the position of the first heat dissipating element relative to the second heat dissipating element by the elastic element.

9 Claims, 4 Drawing Sheets

HEAT DISSIPATING STRUCTURE INCLUDING A POSITION-ADJUSTING UNIT

CROSS REFERENCE TO RELATED APPLICATIONS

This Non-provisional application claims priority under 35 U.S.C. §119(a) on Patent Application No(s). 096149424 filed in Taiwan, Republic of China on Dec. 21, 2007, the entire contents of which are hereby incorporated by reference.

BACKGROUND OF THE INVENTION

1. Field of Invention

The invention relates to a heat dissipating structure and an electronic apparatus utilizing the heat dissipating structure.

2. Related Art

The function of the microprocessor has been improved, so the processing speed thereof become faster and faster. In addition, the size of the host as well as the sizes of the components in the host is reduced, so that the generated heat is increased. Thus, various kinds of heat dissipating structures are evolved continuously so as to provide better heat dissipating effect.

The conventional heat dissipating structure may be a heat sink disposed on an electronic device. Then, a fan unit is utilized to induce the airflow to the outside of the housing. However, since the electronic devices in the housing are arranged closely, the heat generated by the heat sources can not be exhausted efficiently. Thus, the temperature inside the housing is increased. If the temperature inside the housing can not be kept within the normal range, the reliability and lifetime of the electronic apparatus will be affected.

SUMMARY OF THE INVENTION

The invention is to provide a heat dissipating structure and an electronic apparatus with the heat dissipating structure that can efficiently dissipate heat so as to make the electronic device operate normally.

The invention discloses a heat dissipating structure for a heat source. The heat dissipating structure includes a position-adjusting unit, a first heat dissipating element, a second heat dissipating element and a first heat conducting element. The position-adjusting unit has an elastic element. The first heat dissipating element is connected with the position-adjusting unit. The second heat dissipating element contacts with the heat source. A first end of the first heat conducting element contacts with the first heat dissipating element, and a second end of the first heat conducting element contacts with the second heat dissipating element. The position-adjusting unit adjusts a horizontal position of the first heat dissipating element relative to the second heat dissipating element by the elastic element.

In addition, the invention also discloses an electronic apparatus, which includes a housing, a heat source and a heat dissipating structure. The housing has an opening, and the heat source and the heat dissipating structure are disposed in the housing. The heat dissipating structure contacts with the heat source and includes a position-adjusting unit, a first heat dissipating element, a second heat dissipating element and a first heat conducting element. The position-adjusting unit has an elastic element. The first heat dissipating element is connected with the position-adjusting unit. The second heat dissipating element contacts with the heat source. A first end of the first heat conducting element contacts with the first heat dissipating element, and a second end of the first heat conducting element contacts with the second heat dissipating element. The position-adjusting unit adjusts a horizontal position of the first heat dissipating element relative to the second heat dissipating element by the elastic element, so that the first heat dissipating element extrudes from the housing through the opening.

As mentioned above, in the heat dissipating structure and electronic apparatus of the invention, the horizontal position of the first heat dissipating element relative to the second heat dissipating element can be adjusted by the elastic element of the position-adjusting unit. In addition, the heat generated by the heat source can be transmitted to the first heat dissipating element through the second heat dissipating element. Since the first and second heat dissipating elements can be relatively moved in horizontal, the additional space for the rotational movement of the heat dissipating elements is not needed. Thus, the size of the housing for assembling the heat dissipating structure can be decreased.

In addition, the position of the first heat dissipating element can be adjusted, so that the first heat dissipating element may extrude from the housing through the opening. Thus, the heat generated by the heat source in the housing can be dissipated out of the housing through the first heat dissipating element, thereby preventing the increase temperature inside the electronic apparatus caused by the accumulated heat. Thus, the electronic devices can operate normally, and the reliability and lifetime of the product can be improved.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The preferred embodiment of the present invention will be apparent from the following detailed description, which proceeds with reference to the accompanying drawings, wherein the same references relate to the same elements.

Figure 1A:
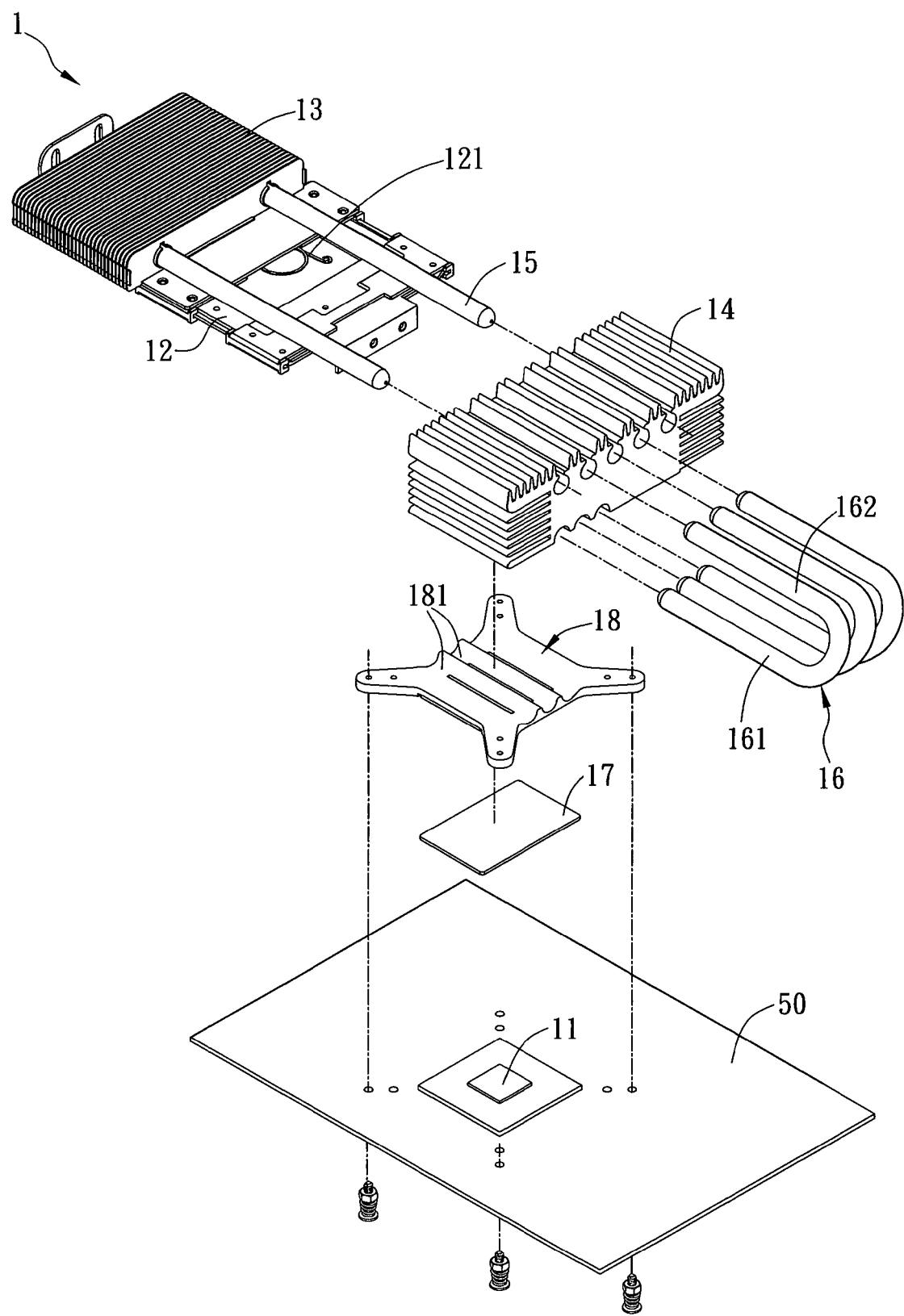
FIG. 1A is an exploded diagram of a heat dissipating structure according to a preferred embodiment of the invention.
Figure 1B:
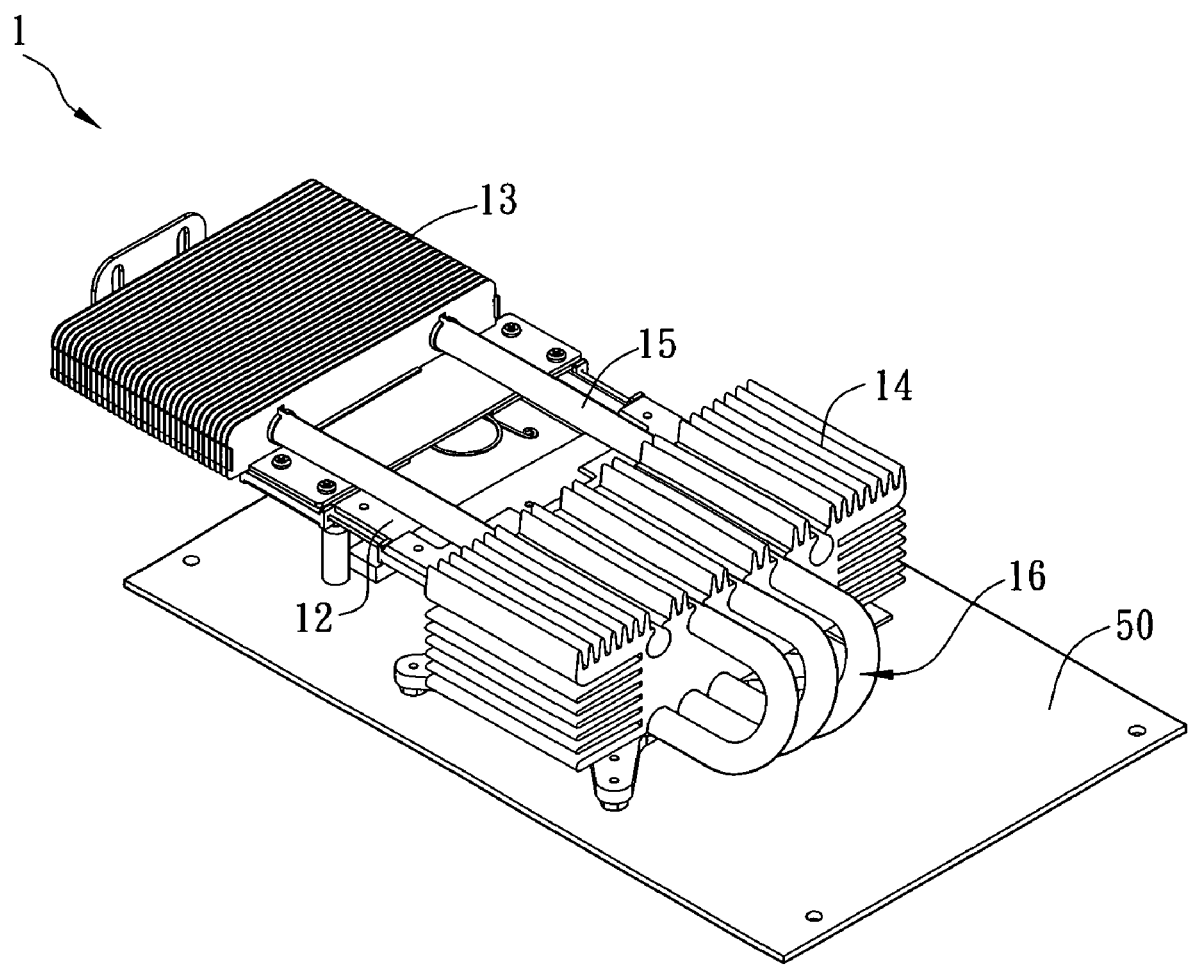
FIG. 1B is a schematic diagram showing the assembled heat dissipating structure according to the preferred embodiment of the invention.

With reference to FIGS. 1A and 1B, a heat dissipating structure 1 according to a preferred embodiment of the invention is cooperated with a heat source 11. The heat dissipating structure 1 includes a position-adjusting unit 12, a first heat dissipating element 13, a second heat dissipating element 14 and a first heat conducting element 15. In the embodiment, the heat source 11 can be, for example but not limited to, a CPU (central processing unit), a microprocessor, a display chip, a graphic chip, a north-bridge chip, a south-bridge chip or a memory. The heat source 11 can be disposed on a circuit board 50. In the embodiment, the circuit board 50 may be a motherboard or a graphics card.

The first heat dissipating element 13 is connected with the position-adjusting unit 12, and the second heat dissipating element 14 directly or indirectly contacts with the heat source 11. In the embodiment, the second heat dissipating element 14 is indirectly contacts with the heat source 11. Each of the first heat dissipating element 13 and the second heat dissipating element 14 respectively includes a plurality of fins.

A horizontal position of the first heat dissipating element 13 relative to the second heat dissipating element 14 can be adjusted by the position-adjusting unit 12. That is, the first heat dissipating element 13 and the second heat dissipating element 14 have a relative displacement, so that the first heat dissipating element 13 can be moved away from the second heat dissipating element 14. Thus, the heat can be transmitted from the second heat dissipating element 14 to a place away from the heat source 11 and then dissipated.

The position-adjusting unit 12 has an elastic element 121, which is connected to the position-adjusting unit 12 and the first heat dissipating element 13. When an external force is applied to the elastic element 121 and the elastic element 121 reaches a critical point, the elastic element 121 generates a torque, which can push the first heat dissipating element 13 towards a direction away from the second heat dissipating element 14. The configuration of the elastic element 121 can make the user more convenient in use. Herein, the elastic element 121 is preferably a torsion spring.

In the embodiment, the first heat dissipating element 13 can be horizontally moved away from the second heat dissipating element 14. Compared with the moving method of the heat dissipating element by rotation, the horizontal movement of the invention does not need the additional space for the rotational movement of the heat dissipating elements. Thus, the size of the housing for assembling the heat dissipating structure can be decreased, so that the invention can be suitable for the electronic apparatuses with smaller volume.

In the embodiment, the first heat conducting element 15 includes two heat pipes. A first end of the first heat conducting element 15 contacts with the first heat dissipating element 13, and a second end of the first heat conducting element 15 contacts with the second heat dissipating element 14. In addition, the heat dissipating structure 1 may further include a second heat conducting element 16. In the embodiment, the second heat conducting element 16 includes a plurality of heat pipes. A first end 161 of the second heat conducting element 16 contacts with the heat source 11, and a second end 162 of the second heat conducting element 16 contacts with the second heat dissipating element 14. In addition, the heat dissipating structure 1 may further include a heat dissipating plate 17 disposed on the heat source 11 and a fixing element 18 for fixing the heat dissipating plate 17.

In the embodiment, a surface of the fixing element 18 is adhered to the heat dissipating plate 17, and the other surface of the fixing element 18 contacts with the first end 161 of the second heat conducting element 16. Thus, the heat generated by the heat source 11 can be conducted to the second heat conducting element 16 through the heat dissipating plate 17 and the fixing element 18. Then, the heat can be transmitted to the first dissipating element 13 through the second heat dissipating element 14 and the first heat conducting element 15 in sequence.

In the embodiment, the fixing element 18 is made of a material with good thermal conductive property. The surface of the fixing element 18 adhered to the second heat conducting element 16 has a concave portion 181 for increasing the total thermal conducting area. In addition, the first heat conducting element 15 and the second heat conducting element 16 may be made of the material with high thermal-conducting coefficient, such as copper or aluminum.

The shape of the heat pipe of the first heat conducting element 15 or the second heat conducting element 16 can be, for example but not limited to, linear, U-shaped or L-shaped. In the embodiment, the heat pipe of the first heat conducting element 15 is linear, so that the position-adjusting unit 12 can be moved linearly. The heat pipe of the second heat conducting element 16 is U-shaped or L-shaped, so that it can contact with the fixing element 18 or the second heat dissipating element 14 thereon and the heat source 11 therebelow. In addition, the volume of the heat dissipating structure 1 can be reduced.

Figure 2:
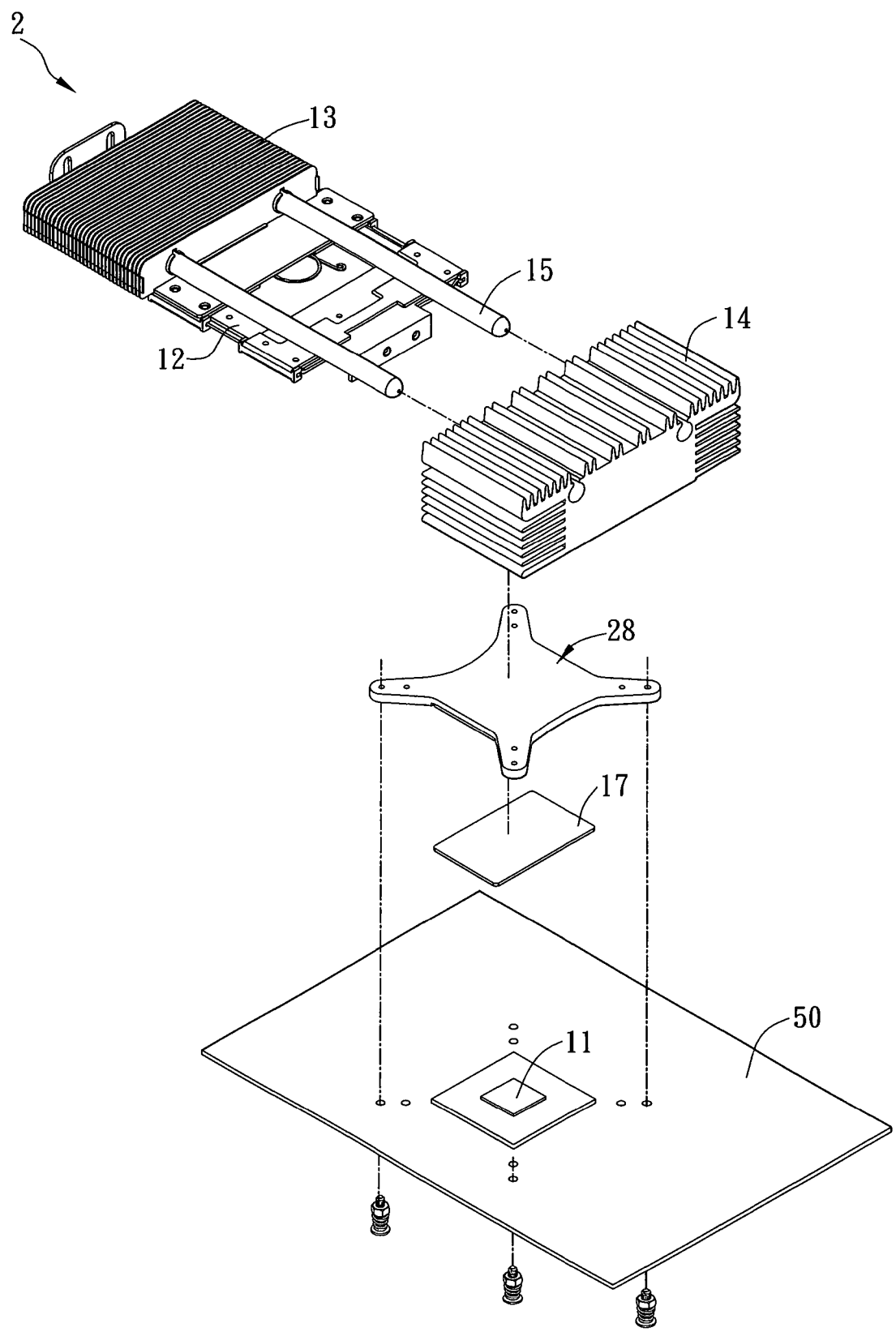
FIG. 2 is an exploded diagram of another heat dissipating structure according to the preferred embodiment of the invention.

As shown in FIG. 2, another heat dissipating structure 2 according to the preferred embodiment of the invention includes a position-adjusting unit 12, a first heat dissipating element 13, a second heat dissipating element 14 and a first heat conducting element 15. A heat dissipating plate 17 and a fixing element 28 are disposed on the heat source 11. In the embodiment, the heat dissipating structure 2 does not include the second heat conducting element. One surface of the fixing element 28 is mounted on the heat dissipating plate 17, and the other surface of the fixing element 28 is directly adhered to the second heat dissipating element 14.

According to the above-mentioned configuration, the heat generated by the heat source 11 can be conducted to the second heat dissipating element 14 through the heat dissipating plate 17 and the fixing element 28. Then, the heat can be transmitted to the first heat dissipating element 13 through the first heat conducting element 15. In addition, the position-adjusting unit 12 can adjust the relative positions of the first heat dissipating element 13 and the second heat dissipating element 14, thereby enhancing the heat dissipating efficiency.

Figure 3:
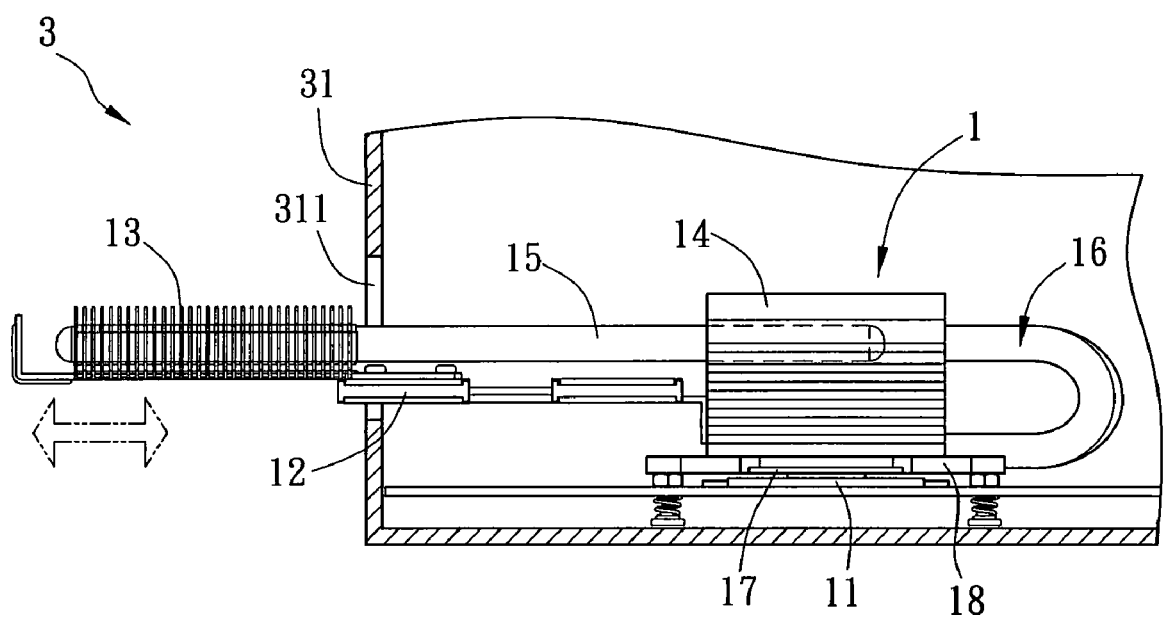
FIG. 3 is a schematic diagram of an electronic apparatus including the heat dissipating structure according to the preferred embodiment of the invention.

With reference to FIG. 3, an electronic apparatus 3 includes a housing 31, a heat source 11 and a heat dissipating structure 1. The heat source 11 and heat dissipating structure 1 of the electronic apparatus 3 are described in the previous embodiment, so the detailed descriptions thereof will be omitted. The housing 31 has an opening 311, and the position-adjusting unit 12 can adjust the first heat dissipating element 13 to extrude from the housing 31 through the opening 311. Thus, the heat generated by the heat source 11 can be conducted to the second heat dissipating element 14 through the heat dissipating plate 17, fixing element 18 and the second heat conducting element 16. Then, the heat can be transmitted to the first heat dissipating element 13 through the first heat conducting element 15, so that the heat can be dissipated out of the housing 31. Accordingly, the internal temperature of the electronic apparatus 3 can be decreased faster, and the electronic devices inside the housing 31 can work within the normal operation temperature range.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. An electronic apparatus, comprising:
a housing having an opening;
a heat source disposed in the housing; and
a heat dissipating structure disposed in the housing and contacting with the heat source, wherein the heat dissipating structure comprises:
a position-adjusting unit having an elastic element;
a first heat dissipating element connected with the position-adjusting unit;
a second heat dissipating element contacting with the heat source; and a first heat conducting element having a first end contacting with the first heat dissipating element and a second end contacting with the second heat dissipating element, wherein the position-adjusting unit adjusts a horizontal position of the first heat dissipating element relative to the second heat dissipating element by the elastic element, so that the first heat dissipating element extrudes from the housing through the opening.

2. The electronic apparatus according to claim 1, wherein each of the first heat dissipating element and the second heat dissipating element of the heat dissipating structure respectively comprises a plurality of fins.

3. The electronic apparatus according to claim 1, wherein the second heat dissipating element contacts with the heat source through a heat dissipating plate.

4. The electronic apparatus according to claim 1, wherein the first heat conducting element is a heat pipe.

5. The electronic apparatus according to claim 1, wherein the heat dissipating structure further comprises:
a second heat conducting element having a first end contacting with the heat source and a second end contacting with the second heat dissipating element.

6. The electronic apparatus according to claim 5, wherein the second conducting element is a heat pipe.

7. The electronic apparatus according to claim 5, wherein the first end of the second heat conducting element contacts with the heat source through a heat dissipating plate.

8. The electronic apparatus according to claim 1, wherein the heat source is a CPU (central processing unit), a microprocessor, a display chip, a graphic chip, a north-bridge chip, a south-bridge chip or a memory.

9. The electronic apparatus according to claim 1, wherein the elastic element is a torsion spring.

* * * * *